Oct. 14, 1941.   H. PFLEUMER   2,258,804
PRESSURE CHAMBER
Filed April 26, 1938
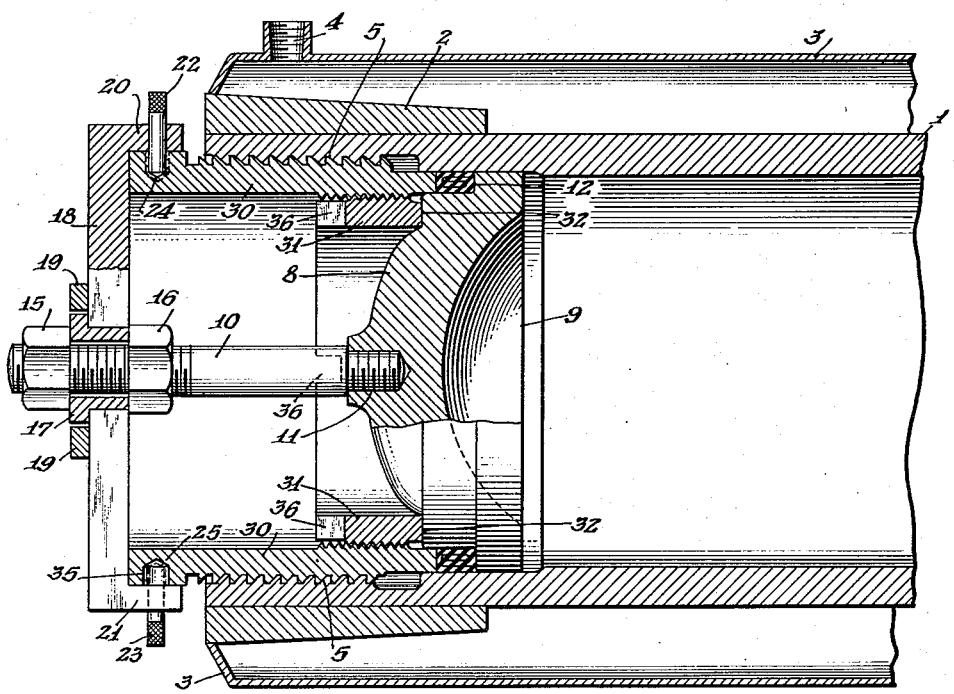
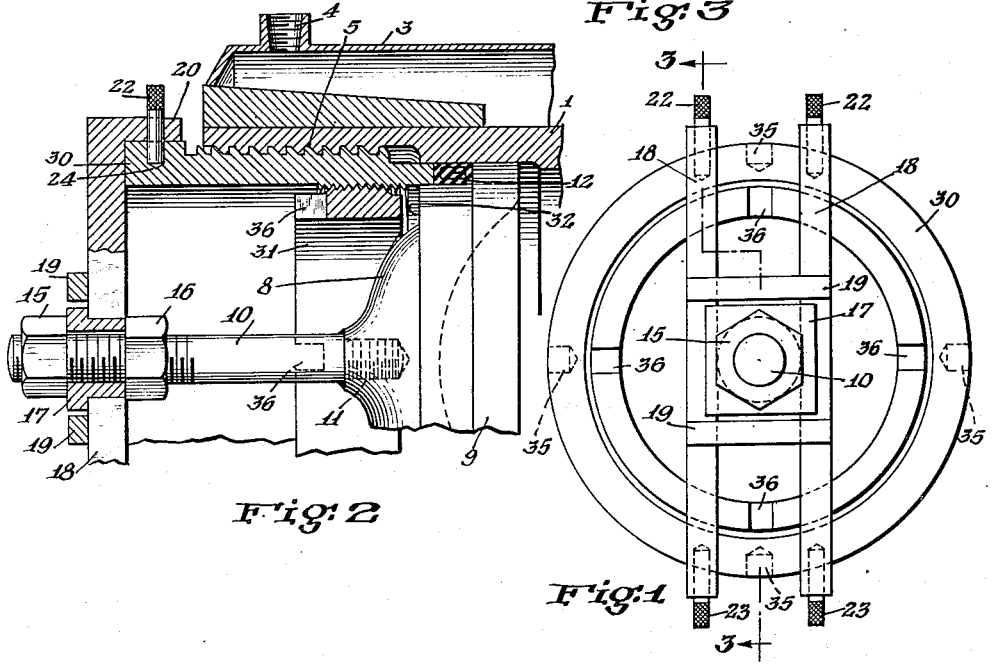
INVENTOR.
Hans Pfleumer
BY Ostrolenk, Greiner & Marsen
ATTORNEYS Patented Oct. 14, 1941

2,258,804

UNITED STATES PATENT OFFICE 2,258,804

PRESSURE CHAMBER

Hans Pfleumer, New Brunswick, N. J., assignor to Rubatex Products, Inc., New York, N. Y., a corporation of Delaware Application April 26, 1938, Serial No. 204,482

5 Claims. (Cl. 220—55)

My invention relates to a novel pressure chamber and means for closing and sealing the chamber. More specifically, my invention relates to a novel apparatus for effecting the secure closing and tight sealing of a pressure chamber or autoclave, whereby the sealing pressure is supplied by the internal pressure and the sealing means is prevented from being overcompressed.

In certain manufactures, the use of high pressure autoclaves is indicated where it is desired to effect treatments under pressures of the order of 4,000 to 5,000 pounds per square inch. Such pressures are employed for example, in the manufacturing of gas expanded rubber. It is exceedingly difficult to seal such high pressure chambers against leakage, and even more difficult to effectively maintain a gasket as a lid seal without injury to the gasket during each pressure operation. Because of the flow of the seal under pressure involved, it often is very difficult to separate the lid from the chamber after the pressure operation is completed.

I have devised a novel autoclave and closure and sealing means therefor, whereby the chamber may be effectively sealed during the pressure operation and readily opened after the pressure operation. I regulate the pressure upon the sealing gasket which is positioned on the closure lid of the autoclave so that irrespective of the high pressures exerted upon the lid, the pressure upon the sealing gasket never is more than a desired low pressure for example 260 pounds per square inch.

It is an object of my invention to provide a novel autoclave in which an effective low pressure seal is effected.

It is another object of my invention to provide an autoclave wherein the gasket carried by the lid is protected from overcompression.

It is a further object of my invention to provide a novel arrangement of autoclave lid, pressure sleeve and thrust ring whereby the thrust ring prevents the lid from compressing the gasket against the pressure sleeve.

It is still a further object of my invention to provide a novel closure arrangement whereby a closure member for a high pressure autoclave may be placed on the autoclave and removed therefrom after the pressure operation with facility.

It is a further object of my invention to provide a high pressure autoclave wherein pressures on the order of 3,000 to 5,000 pounds per square inch are employed whereby the gasket which effects the seal of the lid is maintained under a pressure on the order of 260 pounds per square inch or about 5% of the internal pressure.

It is another object of my invention to provide a means whereby varying grades of softness of the gasket can be employed and maintained under respective optimum pressures by virtue of the adjustability of gasket pressure.

Figure 1 is a front elevation of the autoclave and closure means of my invention.

Figure 2 is a detail of the cross section of the closure means of my invention showing the position of lid with respect to the pressure sleeve and thrust ring of my invention.

Figure 3 is a cross section showing the autoclave and closure means of my invention taken along the line 3—3 of Figure 1 in position during the pressure operation.

Referring now more specifically to the drawing, in Figure 3 I show an autoclave 1 with a reinforcement ring 2 which is shrunken onto the autoclave wall 1. A temperature control jacket 3 surrounds the autoclave. A conduit 4 for the transmission of heating and cooling mediums lies in the jacket 3. A screw threading 5 is cut into the autoclave wall 1. It is because of the weakening effect of this screw threading that the reinforcement ring 2 is placed around this portion of the autoclave 1. Moreover the internal end pressure upon the lid transmitted radially to the chamber wall through the sealing gasket must be compensated for in case thrust ring 31 is left out of contact with lid 8. A lid 8 with a rim 9 is mounted on spindle 10 by the engagement 11. The lid 8 carries a gasket, as of rubber, 12. On the spindle 10 are mounted nuts 15 and 16 which act against the sleeve 17 and the cross-bar 18. As can be seen more clearly in Figure 1, the cross-bars 18 are secured together by the members 19. At each end of the cross-bar 18 are flanges 20 and 21 through which extend pins 22 and 23. These pins 22 and 23 extend respectively into seats 24 and 25 in the pressure sleeve 30. The pressure sleeve 30 is mounted in screw engagement with the autoclave wall 1 by means of the screw threading 5. Mounted on the inner circumference of the pressure sleeve 30 and in screw threading engagement therewith is a thrust ring 31.

The thrust ring 31 bears against the lid 8 at the point 32. As shown in Figure 1, recesses 35 are provided in the pressure sleeve so that the pressure sleeve may be unscrewed from contact with the wall of the autoclave. Similarly, in Figure 3 recesses 36 are provided in the thrust ring to manipulate the thrust ring.

The operation of this autoclave and closure member will now be briefly set forth. The lid 8 mounted on the spindle is first slid into place as shown in the Figures 2 and 3. Thereafter the pressure sleeve 30 is screwed into engagement with the wall of the autoclave 1 as shown in Figures 2 and 3 so that the pressure sleeve permits the lid and gasket a slight back and forth movement. Thrust ring 31 is in the position shown in Figure 2 and not in contact with the lid 8. The cross-bars 18 are then mounted over the spindle and fixed to the pressure sleeve by the pins 22 in the recesses 24 and 25. The nuts 15 and 16 determine the position of the lid in the chamber. Then with the nut 16 loose and positioned at a slight distance from the cross-bar 18, the nut 15 is tightened up to pull the lid 8 out so that the gasket 12 is compressed between the pressure sleeve 30 and the lid 8. The compression of this gasket between the pressure sleeve and the lid is adjusted so that it corresponds to approximately 150 pounds per square inch pressure within the autoclave. It has been found that such a pressure is most desirable since it provides the best seal against leakage, the gasket at that degree of compression being most effective. The pressure of 150 pounds per square inch within the autoclave produces a pressure of 260 pounds per square inch on the gasket as will be more specifically pointed out hereinafter.

The construction of the closure member of my invention is designed to maintain the gasket at this compression throughout the high pressure gassing operation within the autoclave so that the most effective seal is constantly maintained, and so that the lid can be quickly and efficiently removed from the autoclave at the end of the operation. It is to be noted that this pressure of 260 pounds per square inch on the gasket provides the proper gasket seal even when pressures up to 3,000 to 5,000 pounds per square inch are used in the autoclave. The chamber is then evacuated, which is a necessary step in the gassing operation, but the engagement of the lid and spindle with the nut 15 and cross-bar 18 maintains the lid in proper position during this evacuation.

After the evacuation, the pressure within the chamber is raised until it corresponds to 150 pounds per square inch. At this point with, as has been pointed out, 260 pounds per square inch pressure on the gasket, the apparatus is adjusted to maintain the seal in this pressure condition permanently during the operation. This is effected by tightening up the thrust ring 31 until it bears against the surface of the lid 8 at the point 32. The gasket is now maintained between the pressure sleeve 30 and the lid 8 at a pressure of 260 pounds per square inch, and the thrust ring 31, by reason of its engagement and space maintenance between the pressure sleeve 30 and the lid 8 at the point 32, absolutely locks the pressure lid against further advance of the influence of the gas pressures within the autoclave. Thus, irrespective of the high pressures of the order of 3,000 to 5,000 pounds per square inch, the lid cannot further advance to compress the gasket. Thus, the optimum sealing conditions are maintained throughout the operation and the gasket is unimpaired by the use.

Customarily, when the high pressures are exerted on the gasket, as in prior devices of this kind, the gasket flows under the high pressures and fails not only as a sealing device but presents difficulties in the separation of the lid and the autoclave. Also the radial pressure against the chamber wall in the vicinity of the gasket is enormously increased over the existing internal pressure by reason of the internal end pressure upon the lid being transferred upon the chamber wall through the gasket at the ratio of about 1:2.

By means of the interlocking and space maintenance nature of the component parts of my autoclave and closure device, the high pressures within the autoclave are absorbed by rigid metallic members which are unaffected thereby. Further, the nature of the arrangement of my apparatus provides for facility in assembly and subsequently dismantling in the termination of the operation.

After the gassing or pressure operation has been finished, and the pressure within the autoclave has been reduced to normal, the nut 15 is loosened and the nut 16 is manipulated so as to move to the left on the spindle 10. The nut 16 pressing against the cross-bars 18 forces the lid 8 inwardly and provides a clearance between the thrust ring 31 and the area 32 of the lid, as shown in Figure 2. It is then a simple matter to loosen the thrust ring 31 and subsequently, after the cross-bar has been removed, the pressure sleeve 30 is withdrawn from the autoclave.

It is to be noted that once the thrust ring 31 is screwed into contact with the lid in the beginning of the operation, the cross-bar 18 and the nuts 15 and 16 have no utility during the operation itself. No pressure is exerted thereon by the lid of the autoclave. The cross-bar 18 and its component parts are employed to properly position the lid at the beginning of the process and to facilitate dismantling at the end of the operation.

The high pressures to which a gasket such as is customarily used in autoclaves of this nature is subjected, can be illustrated in an autoclave having a lid with a 10 inch diameter where the pressure inside the chamber reaches 5,000 pounds per square inch. Under this pressure, there is a total end pressure on the lid of approximately 400,000 pounds. This total end pressure is transmitted to the gasket. With a gasket of one inch width and one half inch face, the total area of the gasket will be:

14.5 square inches for the face
+31.5 square inches for the width
———
46.0 square inches With the 400,000 pounds pressure transmitted to this gasket area, the gasket is subjected to a pressure of about 8700 pounds per square inch. About ⅔ of this pressure is transmitted to the chamber wall or 5800 pounds per square inch above the 5000 pounds per square inch radial gas pressure to which the chamber wall is also exposed. As has been set forth above, a pressure of approximately 150 pounds per square inch in the chamber (amounting to a gasket pressure of 150/46×80 or 260 pounds per square inch, places the gasket under proper pressure to obtain the best seal. A decidedly inferior sealing will be obtained and the gasket itself will be deleteriously affected when high pressures are transmitted directly to the gasket as in prior practice.

As a matter of fact the gasket will flow under these high pressure conditions and destroy the sealing and the ultimate separation of the lid from the autoclave is rendered exceedingly difficult. The gasket is usually permanently impaired when subjected to high pressures of this nature, By means of the novel apparatus of my invention, the high pressure exerted on the lid is absorbed in large part by the thrust ring and pressure sleeve arrangement, by means of which the pressure upon the gasket itself is maintained at such low levels as have been found to give optimum results.

I claim:

1. In combination, a pressure chamber having an open end, a closure member and a gasket positioned between a periphery of said closure member and the internal surface of the open end of said pressure chamber, a pressure sleeve in screw thread engagement with said pressure chamber in said open end, said closure member being positively positioned by means of a rigid member comprising a thrust ring, said thrust ring being in screw-thread engagement with said pressure sleeve, said closure member being positioned in spaced relation from said pressure sleeve whereby a predetermined pressure is maintained upon said gasket.

2. In combination, a pressure chamber having an open end, a closure member and a gasket positioned between a periphery of said closure member and the internal surface of the open end of said pressure chamber, a pressure sleeve in screw thread engagement with said pressure chamber in said open end, said closure member being positively positioned by means of a rigid member comprising a thrust ring, said thrust ring being in screw-thread engagement with said pressure sleeve, said closure member being positioned in spaced relation from said pressure sleeve, said pressure sleeve being in screw-thread engagement with the wall of said pressure chamber whereby a predetermined pressure is maintained upon said gasket.

3. A pressure chamber having an open end, a pressure sleeve disposed within the open end of said pressure chamber and in engagement therewith, a thrust ring disposed within said pressure sleeve and in engagement therewith, a closure member for said pressure chamber positioned in said open end, a gasket positioned between said closure member and said pressure sleeve to provide a seal for said pressure chamber, said thrust ring being positioned to bear against the face of said closure to maintain said closure member in fixed spaced relation from said pressure sleeve whereby said gasket between said closure member and said pressure sleeve may not be overcompressed.

4. In combination, a pressure chamber having an open end, a closure member positioned in said open end and a gasket positioned between a periphery of said closure member and the wall of the opening of said pressure chamber, a pressure sleeve positioned within and in screw-thread engagement with the wall of said pressure chamber, said pressure sleeve bearing against said gasket, a thrust ring positioned within and in screw-thread engagement with said pressure sleeve, said thrust ring being positioned to bear rigidly against the face of said closure member so that notwithstanding high pressure within said pressure chamber said closure member is positively prevented from moving against said pressure sleeve and thereby overcompress said gasket.

5. In combination, a pressure chamber having an open end, a closure member positioned in said open end and a gasket positioned between a periphery of said closure member and the wall of the opening of said pressure chamber, said closure member being positively positioned by means of a thrust ring mounted on a pressure sleeve, a spindle affixed to said closure member, two nuts in screw-thread engagement with said spindle, and a cross bar between said nuts, said cross bar being detachably secured to said pressure sleeve.

HANS PFLEUMER.